United States Patent [19]

Labb

[11] Patent Number: 4,553,164
[45] Date of Patent: Nov. 12, 1985

[54] SPATIAL CORRECTION DEVICE FOR AN IMAGE ANALYZER

[75] Inventor: Georges Labb, Paris, France
[73] Assignee: Thomson-CSF, Paris, France
[21] Appl. No.: 417,592
[22] Filed: Sep. 13, 1982
[30] Foreign Application Priority Data Oct. 2, 1981 [FR] France .................. 81 18638

[51] Int. Cl.$^4$ .............................. H04N 5/14
[52] U.S. Cl. .................................. 358/163
[58] Field of Search ................ 358/163, 164, 162

[56] References Cited

U.S. PATENT DOCUMENTS

| | | | |
|---|---|---|---|
| 3,902,011 | 8/1975 | Pieters | 358/163 |
| 4,309,723 | 1/1982 | Ryan | 358/163 |
| 4,437,110 | 3/1984 | Hunaut | 358/163 |

FOREIGN PATENT DOCUMENTS 1353147  5/1974  United Kingdom.

Primary Examiner—Tommy P. Chin
Attorney, Agent, or Firm—Oblon, Fisher, Spivak, McClelland & Maier

[57] ABSTRACT

A spatial correction device for an image analyzer having an image restitution support medium and a device for scanning the support medium. A memory is provided for storing, for each of the MN rectangles resulting from dividing the image restitution support medium of the analyzer into a grid of M groups of L lines each and N columns, a predetermined correction signal. Also included is a sequencer for ensuring that the correction signals are properly applied as well as an interpolation device for calculating the intermediate values of the correction signals corresponding to each of the L lines of a given rectangle. This interpolation device also avoids the derivative ruptures of the correction signals during their transition between adjacent rectangles which are situated in the same column.

4 Claims, 2 Drawing Figures

SPATIAL CORRECTION DEVICE FOR AN IMAGE ANALYZER

BACKGROUND OF THE INVENTION

1. Field of the Invention

The present invention relates to a spatial correction device for an image analyzer.

2. Description of the Prior Art

By spatial correction is understood the correction of defects, due to the analyzer and which result in a spatial distortion between the analyzed image and the image restituted by the analyzer. By way of example, defects of convergence, geometry or shading may be mentioned.

Convergence defects only occur in color image analyzers. They are due to imperfect superimposition, on the image restitution support medium, of the electron beams associated with each of the three fundamental colors and they result in the presence of colored fringes on the outlines of objects.

Geometry and shading defects occur in all image analyzers, whether they operate in black and white or in color and are due to imperfections of the analysis system itself. Geometry defects result in geometrical deformation of the restituted image in relation to the analyzed image, and shading defects result in the presence of a background of non constant gray in the restituted image when the analyzed image has a background of a constant gray.

A device for correcting convergence defects for color cameras is disclosed in U.S. Pat. No. 4,437,110, issued Mar. 13, 1984, filed in the name of the Applicant. This device comprises essentially a memory, called a correction memory, adapted to store, for each of the rectangles resulting from dividing the screen of the camera into a grid of M groups of L lines each and N columns, a predetermined horizonntal scan correction signal and a predetermined vertical scan correction signal proper to each of the two of the three fundamental colors, and a sequencer for controlling the application of these correction signals to scaninnng means during passage of the scanning means through the corresponding rectangles of the screen. Means for attenuating the discontinuities existing between horizontal and vertical scan correction signals associated with adjacent lines of the same column are also provided so as avoid the lines from moving closer together or moving away too suddenly during transitions between the different values of the corresponding correction signals. Two examples of these attenuation means are given. One analog embodiment consists in attenuating these discontinuities by means of filters of the "RC" type. One digital embodiment consists in attenuating these discontinuities by causing integration of the correction signal by means of an adder and a memory, called integration memory, associated with the correction memory.

Though these embodiments of means for attenuating the discontinuities between correction signals contribute in preventing the lines from suddenly drawing closer or moving away, they leave untouched another problem which is due to the presence of derivative ruptures during transitions between correction signals. In fact, the method of filtering by integration only attenuates the amplitude difference between two successive correction signals, but leaves fronts to continue to exist during transitions between successive correction signals. The method of filtering by means of "RC" type filters attenuates both the amplitude difference and the fronts between successive correction signals. However, it does not attenuate these fronts perfectly, for it maintains the presence of derivative ruptures during transitions.

These derivative ruptures have harmful consequences on the behavior of some component elements of the analyzer. The aim of the present invention is to avoid these disadvantages.

SUMMARY OF THE INVENTION

It is the object of this invention to provide a spatial correction device for an image analyzer in which the transitions between correction signals take place without derivative ruptures in so far as the component elements of the image analyzer are concerned.

According to the invention, the spatial correction device, for an image analyzer which includes an image restitution support medium and a means for scanning this support, utilizes a memory, called a correction memory, adapted to store for each of the MN rectangles resulting from dividing up the image restitution support medium of the analyzer into a grid of M groups of L lines each and N columns, a predetermined correction signal associated with this rectangle, a sequencer for ensuring that these correction signals are applied during the passage of the scanning means through the corresponding rectangles of the image restitution support medium and interpolation means for calculating the intermediate values of the correction signals to be applied during the passage of the scanning means through each of the L lines of a given rectangle, so as to avoid the derivative ruptures of the correction signals during transitions between this rectangle and adjacent rectangles situated in the same column.

The objects and features of the present invention will appear more clearly from reading the following description of one embodiment, this description being made with reference to the accompanying drawings.

DESCRIPTION OF THE PREFERRED EMBODIMENT

Figure 1:
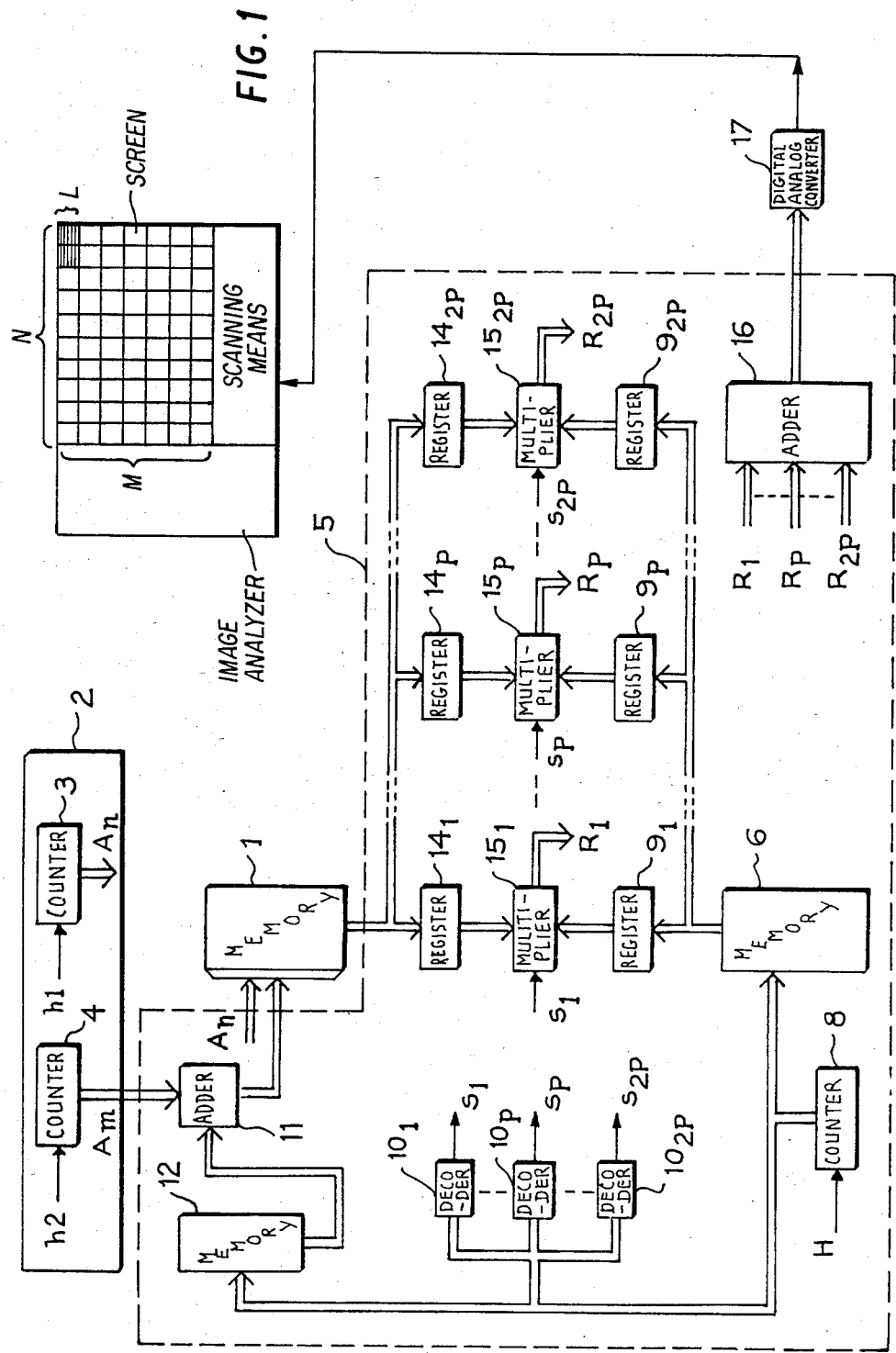
FIG. 1 shows a spatial correction device in accordance with the invention.

The convergence device shown in FIG. 1 comprises a first memory 1, called a correction memory, for storing predetermined correction signal values associated with different zones of the surface of the image restitution support medium, and intended to be applied either to the scanning means of the image analyzer, if it is a question of a convergence or geometry correction, or to the restituted image generation means if it is a question of a shading correction, when the scanning means pass through the different zones. These different zones result from dividing up the surface of the image restitution support medium into a grid of M groups of L lines each and N columns. With the MN rectangles thus defined are associated predetermined correction signal values. By way of example, in the case of a 625 line frame, the surface of the image restitution support medium is divided up into 13 columns (N=13) and 14 groups of 20 lines each (M=14 and L=20).

The present invention does not relate to the determination of the values to be attributed to the correction values, but to the application of these signals to the image analyzer. This is why the way in which the correction signals are obtained will not be described in detail.

The spatial correction device also comprises a sequencer 2 itself having a first counter 3 and a second counter 4 for addressing the correction memory.

The first counter 3 is incremented by a clock signal $h_1$ of frequency Nf, f designating the line scan frequency of the image restitution support medium. The second counter 4 is incremented by a clock signal $h_2$ of frequency f/L.

The first counter 3 is a modulo N counter having outputs $A_n$ (with n variable from 0 to the whole part of $\log_2 N$) supplying the light weight bits for addressing the correction memory. The second counter 4 is a modulo M counter with outputs $A_m$ (m being variable from 0 to the whole part of $\log_2 M$) supplying the heavy weight bits for addressing the correction memory.

The spatial correction device also comprises interpolation means 5 for calculating the intermediate values of the correction signals to be applied to each of the L lines of a given rectangle.

The interpolation means 5 comprise a second memory 6, called smoothing memory, for storing 2P predetermined smoothing coefficient values associated with each of the L lines of each of the MN rectangles forming the above-mentioned grid (with P an integer $\geq 0$). The smoothing memory 6 is provided with address inputs connected to the outputs of a third modulo 2P counter 8 incremented by a clock signal H synchronous with the clock signal $h_1$ and presenting, during each period of the signal $h_1$, a series of 2P pulses each of a duration at least equal to the reading access time for the smoothing memory (or the correction memory). The outputs of the smoothing memory are connected to the inputs of 2P registers $9_1$ to $9_{2P}$ each having a clock input connected to the output of a decoder $10_p$ of the value p (with p variable from 1 to 2P). Decoders $10_p$ each have inputs connected to the outputs of counter 8 and an output supplying a signal $s_p$.

The interpolation means 5 also comprise a circuit for addressing the correction memory. This addressing circuit comprises an adder 11 with first inputs connected to the outputs of the second counter 4 and second inputs connected to the outputs of a third memory 12, called correction memory successive addressing memory, itself having address inputs connected to the outputs of counter 8. Into memory 12 are sequentially written the values $-P, -(P-1) \ldots, -1, 0, +1 \ldots, P-2, P-1$. The address inputs of the correction memory 1 are connected to the juxtaposed outputs of counter 3 and adder 11.

The interpolation means 5 also comprise an array of 2P registers 14 (with p variable from 1 to 2P) having data inputs connected to the outputs of the correction memory and clock inputs connected respectively to the outputs the decoders $10_p$.

The interpolation means 5 also comprise an array of 2P multipliers $15_p$, each having first and second inputs connected respectively to the outputs of registers $9_p$ and $14_p$, and an output supplying a signal $R_p$ and an adder 16 having 2P inputs connected respectively to the outputs of multipliers $15_1$ to $15_{2P}$.

The spatial correction device also comprises a digital-analog converter 17 inserted between the outputs of adder 16 and the input of the image analyzer element to which the correction signals are to be applied.

The spatial correction device shown in FIG. 1 operates in the following way.

For a given value of m (m variable from 1 to M) and for a given value of n (n variable from 1 to N), there are read out from the correction memory 1 the values of the correction signals associated with the corresponding rectangles of the image restitution support medium, the order of reading out the correction signals from the correction memory being determined by the priority of the horizontal scan over the vertical scan, i.e. by the priority of evolution of variable n over variable m. The discontinuities existing between the correction signals associated with two adjacent columns situated in the same group of lines are naturally attenuated because the scanning takes place along lines, either by the scanning means, or by any other means usually filtering the discontinuities of the signals. On the other hand, the discontinuities existing between correction signals associated with two groups of adjacent lines situated in the same column cannot be attenuated in this way. This is why the spatial correction device of the invention is provided with interpolation means 5 for predicting the evolution of the correction signal from one line to another in a given rectangle. These interpolation means operate in the following way.

For given values of m and n, i.e. for a given rectangle and for a given value of the correction signal associated with this rectangle by the correction memory, a particular value of the correction signal is calculated for each value of q (with q variable from 1 to L) i.e. for each of the L lines of the group of lines of number m considered.

Suppose that $x_{q,m,n}$ is the value of the correction signal associated with line number q belonging to the group of lines of number m situated in the column number n. This value is not supplied by the correction memory but is calculated by the interpolation means of the invention in accordance with the following formula.

Suppose that $x_{m,n}$ is the value of the correction signal associated with the group of lines of number m situated in the column number n.

Also suppose that $x_{m-P,n}, x_{m-(P-1),n} \ldots x_{m-1,n}$ on the one hand and $x_{m+1,n}, \ldots x_{m+P,n}, x_{m+P+1,n}$ are the values of the correction signals stored in the correction memory and associated with the 2P−1 rectangles of coordinates m−P,n; m−(P−1)n; ... and m−1,n on the one hand and m+1,n; m+P,n; m+P+1,n on the other, situated on each side of the rectangle of coordinates m,n in the same column n. Suppose also that $a_{pqm}$ (with p variable from 1 to 2P) are the 2P values of the smoothing coefficients associated with line number q of the group of lines number m by the smoothing memory.

In accordance with the invention, the intermediate correction signal assigned to line q of the group of lines number m situated in column number n is written:

$$x_{gm,n} = a_{1gm} x_{m-P,n} + a_{2gm} x_{m-(P-1),n} + \cdots + a_{pgm} x_{m-1,n} + a_{(P+1)gm} x_{m,n} + a_{(P+2)gm} x_{m+1,n} + \cdots + a_{(2P-1)gm} x_{m+P,n} + a_{2Pgm} x_{m+P+1,n}$$

For that, when, during a given period of the clock signal of frequency Nf, the sequencer 2 reaches the values $A_m$ and $A_n$ corresponding to the address in the correction memory of the correction signal $x_{mn}$ associated with the rectangle of coordinates m n, adder 11 supplies successively the 2P addresses in the correction memory of the correction signal associated with the rectangle of coordinates m,n and of the correction signals associated with the 2P−1 rectangles situated on each side of the rectangle m n considered in the same column n. During the same period of the clock signal h₁, the 2P addresses thus obtained are used successively for addressing the correction memory which then supplies the correction signals associated with the 2P rectangles situated in the same column n, these signals being stored in registers $14_p$ activated successively at the same rate at which the correction memory is addressed by means of decoders $10_p$ and counter 8 incremented by the clock signal H.

During this same period of clock signal $h_1$, the smoothing memory is addressed successively 2P times so as to provide the 2P smoothing coefficients $a_{pqm}$ associated with the line portion whose coordinates qmn correspond to the considered period of clock signal $h_1$.

These 2P coefficients are stored successively in registers $9_p$, at the same rate as the interpolation memory is addressed, by means of counter 8 and decodes $10_p$.

Having then simultaneously the correction signals stored in registers $14_p$ and the smoothing coefficients stored in registers $9_p$, the correction signal associated with the line portion considered may then be calculated in accordance with the above-mentioned formula. This is the role of the multipliers $15_p$ and adder 16.

The smoothing coefficients a are determined either automatically, or manually, so as to reproduce the trend of the curve chosen for representing the evolution of the correction signal between the compulsory passage points corresponding to the values stored in the correction memory.

Figure 2:
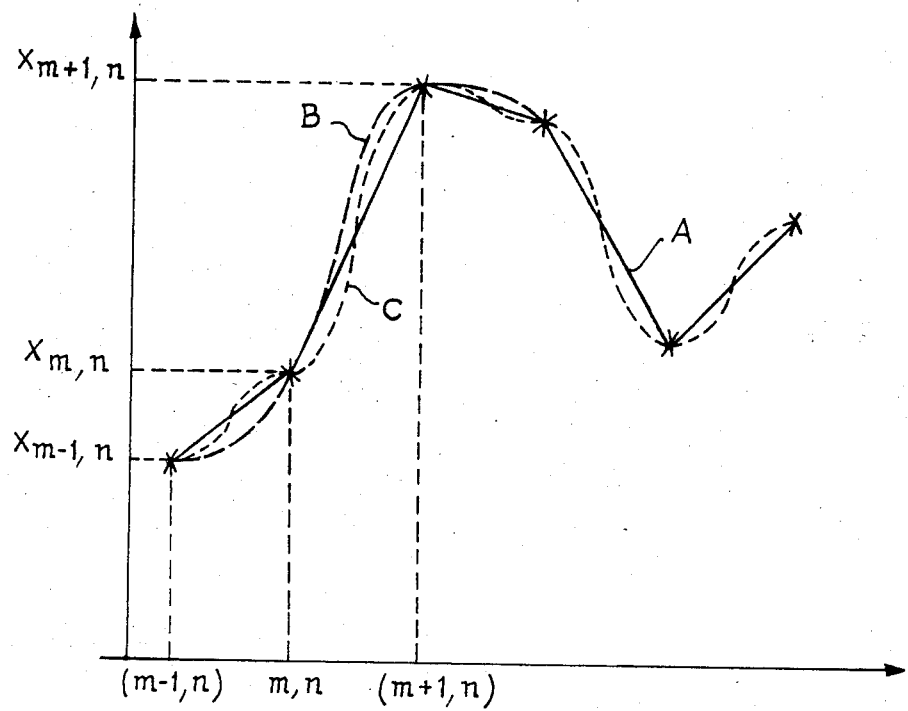
FIG. 2 is a diagram showing the trend of the transitions between correction signals with a spatial correction device in accordance with the invention.

FIG. 2 shows three examples joining up values of the correction signals stored in the correction memory, these values being represented by crosses.

A first curve example, corresponding to curve A, shown by a continuous line, corresponds to a linear interpolation, which only requires two correction signals: $x_{m,n}$ and $x_{m-1,n}$ or else $x_{m,n}$ and $x_{m+1,n}$ to be known and the two associated smoothing coefficients to be stored. This example is not very advantageous in practice for, as was seen above, it leaves existing derivative ruptures during transitions.

A second curve example, corresponding to curve B, shown with a large dash line, corresponds to interpolation by means of an "S" curve, i.e. such that the tangents to the curve of evolution of the correction signal at the transition points are horizontal. This example requires more than two values of the correction signals situated on each side of the line considered to be known and so more than two smoothing coefficients per line to be stored. This example is more advantageous in practice, for it avoids the presence of derivative ruptures at the transition points. It may however present the drawback of not reflecting very accurately the evolution of the correction signal between two transition points. A remedy may be found for this situation by increasing the number of correction signal values situated on each side of the line considered, and taken into account in the calculation, as well as the number of associated smoothing coefficients. This is what is shown by a third curve example, shown with a smaller dash line (curve C), which corresponds to interpolation with tangency prediction at the transition points.

It clearly appears that the greater the desired accuracy for the evolution of the correction signal between the transition points, the more complex becomes the construction of the spatial correction device (increase in the capacity of the interpolation memory, in the number of registers, multipliers . . . ) and requires high speed operating components (the interpolation having to take place in the same time whereas it is more complex and so longer), resulting in the need to compromise between the desired performances and the means available.

Without departing from the scope of the invention, it is possible to make a number of modifications to the device described.

For example, the weighted sum of the correction signals may possibly be provided not by means of as many multipliers as there are correction signals to be taken into account but by means of a single multiplier used sequentially.

The number of correction signals stored in the correction memory may also be increased by taking into consideration additional variables such as the frame or the type of fault to be corrected.

What is claimed is:

1. A spatial correction device for supplying a correction signal to an image analyzer having a screen divided into M groups of L lines each and N columns thereby forming MN rectangles and scanning means for scanning said screen, said device comprising:

a correction memory for storing, for each of the MN rectangles, a predetermined correction signal;

a sequencer for addressing the correction memory for applying a correction signal corresponding to each of said MN rectangles scanned by said scanning means; and interpolation means coupled to said correction memory for calculating a value of the correction signal to be applied during passage of the scanning means through each of the L lines of each of said rectangles, so as to avoid derivative ruptures of the correction signal during transitions between said each rectangle and the adjacent rectangles situated in the same column, wherein said interpolation means comprises a means for restituting successively during the passage of the scanning means through each of the lines of said rectangle, the values of the correction signals stored in the correction memory associated with 2P−1 (P being an integer greater than 0) rectangles situated on each side of said each rectangle scanned by the scanning means, means for storing 2P smoothing coefficients associated with each line of said each rectangle scanned by the scanning means, and for restituting the 2P smoothing coefficients during the passage of the scanning means through each line of a rectangle, and means for calculating the sum of the 2P correction signals weighted by the corresponding smoothing coefficients wherein said means for calculating the sum of the 2P correction signals supplies the output signal of the interplation means.

2. The device as claimed in claim 1, wherein said sequencer comprises a first modulo N counter, incremented by a clock signal of frequency Nf where f designates the line scan frequency of the image analyzer, and a second modulo M counter, incremented by clock signal of frequency f/L, and said means for restituting successively the values of 2P−1 correction signals, comprises an adder having first inputs connected to the outputs of said second modulo M counter, an addressing memory, for addressing the correction memory into which are sequentially written the 2P values −P, −(P−1), . . . −1,0,+1 . . . , P−2,P−1, said addressing memory having address inputs connected to the outputs of a modulo 2P counter incremented 2P times during the same period of the clock signal of frequency Nf, and having outputs connected to a second input of said adder, and 2P first registers connected to the outputs of the correction memory for loading in the 2P first registers the correction signal stored in the correction memory.

3. The device as claimed in claim 2, wherein the means for storing the 2P smoothing coefficients associated with each line portion having coordinates q,m,n and for restituting them successively during passage of the scanning means through each line portion comprises a smoothing memory, addressed by a modulo 2P counter, incremented 2P times during the same period of the clock signal of frequency Nf, and 2P second registers connected to the outputs of the smoothing memory and activated respectively when the modulo 2P counter is incremented for the $p^{th}$ time.

4. The device as claimed in claim 3, wherein the means for providing a weighted sum of the correction signals comprise 2P multipliers having inputs connected respectively to the outputs of the 2P first and 2P second registers and an adder with 2P inputs connected to the outputs of the 2P multipliers.

* * * * *